United States Patent
Streeter

(10) Patent No.: US 12,460,696 B2
(45) Date of Patent: Nov. 4, 2025

(54) MOUNTING LUG WITH PARTICLE DAMPING AND METHOD OF MANUFACTURE

(71) Applicant: Hamilton Sundstrand Corporation, Charlotte, NC (US)

(72) Inventor: James Streeter, Torrington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 275 days.

(21) Appl. No.: 18/138,536

(22) Filed: Apr. 24, 2023

(65) Prior Publication Data

US 2024/0352987 A1    Oct. 24, 2024

(51) Int. Cl.

| | |
|---|---|
| *F16F 15/02* | (2006.01) |
| *B22F 10/28* | (2021.01) |
| *B22F 10/68* | (2021.01) |
| *B33Y 10/00* | (2015.01) |
| *B33Y 40/20* | (2020.01) |

(Continued)

(52) U.S. Cl.
CPC .............. *F16F 15/02* (2013.01); *B22F 10/28* (2021.01); *B22F 10/68* (2021.01); *B33Y 10/00* (2014.12); *B33Y 40/20* (2020.01); *B33Y 80/00* (2014.12); *F16F 7/01* (2013.01); *B22F 2998/10* (2013.01); *F16F 2222/04* (2013.01); *F16F 2226/04* (2013.01); *F28F 2265/30* (2013.01)

(58) Field of Classification Search
CPC .......... F16F 15/02; F16F 7/01; F16F 2222/04; F16F 2226/04; F16F 15/00; F16F 2222/00; F16F 2226/00; B22F 10/28; B22F 10/68; B22F 2998/10; B22F 3/1115; B22F 10/64; B22F 10/00; B33Y 10/00; B33Y 40/20; B33Y 80/00; F28F 2265/30

See application file for complete search history.

(56) References Cited

U.S. PATENT DOCUMENTS

| | | | |
|---|---|---|---|
| 9,893,506 B2 * | 2/2018 | Backe | ............ H02G 7/14 |
| 9,903,434 B2 | 2/2018 | Erno et al. | |
| 11,333,027 B2 | 5/2022 | Pollet | |

(Continued)

FOREIGN PATENT DOCUMENTS

| | | |
|---|---|---|
| DE | 102008049683 A1 | 6/2009 |
| DE | 102010046579 A1 | 3/2012 |

(Continued)

OTHER PUBLICATIONS

Extended European Search Report for EP Application No. 24171378.3, dated Oct. 1, 2024, 14 pages.

(Continued)

*Primary Examiner* — Lawrence Averick
(74) *Attorney, Agent, or Firm* — Kinney & Lange, P.A.

(57) ABSTRACT

A vibration damping component for a vehicle includes a housing, and a mounting lug attached to the housing. The mounting lug includes an outer shell with a top, a bottom, and sides. The mounting lug also includes a bore through the outer shell from the top to the bottom. The mounting lug also includes a cavity, an interior lattice, and a damping media. The outer shell and the bore enclose the cavity. The interior lattice is within the cavity and stiffens the mounting lug. The damping media is enclosed in the cavity and between solid portions of the interior lattice.

9 Claims, 9 Drawing Sheets

(51) Int. Cl.
  *B33Y 80/00* (2015.01)
  *F16F 7/01* (2006.01)

(56) References Cited

U.S. PATENT DOCUMENTS

| | | | |
|---|---|---|---|
| 11,365,942 | B2 | 6/2022 | Kelley et al. |
| 2007/0283786 | A1 | 12/2007 | Kappmeyer |
| 2015/0255973 | A1* | 9/2015 | Backe .................. F16F 15/023 |
| | | | 248/568 |
| 2017/0184108 | A1* | 6/2017 | Scancarello ........... B33Y 10/00 |
| 2019/0285363 | A1 | 9/2019 | Ruiz et al. |
| 2020/0370678 | A1 | 11/2020 | Feng et al. |
| 2023/0120872 | A1* | 4/2023 | Burdeniuc ........... C08G 18/678 |
| | | | 522/4 |
| 2024/0300173 | A1* | 9/2024 | Kochbeck ............... B29C 48/02 |
| 2024/0352987 | A1* | 10/2024 | Streeter ..................... F16F 7/01 |

FOREIGN PATENT DOCUMENTS

| | | |
|---|---|---|
| DE | 102010063725 A1 | 6/2012 |
| DE | 102019118395 B3 | 10/2020 |
| EP | 3689500 A1 | 8/2020 |

OTHER PUBLICATIONS

Cempel, C. and Lotz, G., "Efficiency of Vibrational Energy Dissipation by Moving Shot," Journal of Structural Engineering, vol. 119, No. 9, 1993, pp. 2642-2652, American Society of Civil Engineers, Reston, VA.

Panossian, H. V., "Nonobstructive Particle Damping: A New Passive Damping Technique," Shock and Vibration, vol. 1, No. 6, 1991, pp. 4-10.

Hollkamp, J. J. and Gordon, R. W., "Experiments with Particle Damping," Proceedings of SPIE, Smart Structures and Materials: Passive Damping and Isolation, 3327, 1998, pp. 2-12.

Fricke, R., "Lodengraf Damping—An Advance Vibration Damping Technology," Sound and Vibration, Jul. 2000, pp. 22-27.

Papalou, A. and Masri, S. M., "An experimental Study of Particle Dampers Under Random Excitation," Proceedings of First World Conf. on Structural Control, Los Angeles, California, Aug. 1994, pp. FP2-18 to FP2-24.

Simonian, S.S., "Particle Damping Applications",45th AIAA-SDM Conference, Paper No. 2004-1906, Palm Springs, California, 2004.

* cited by examiner

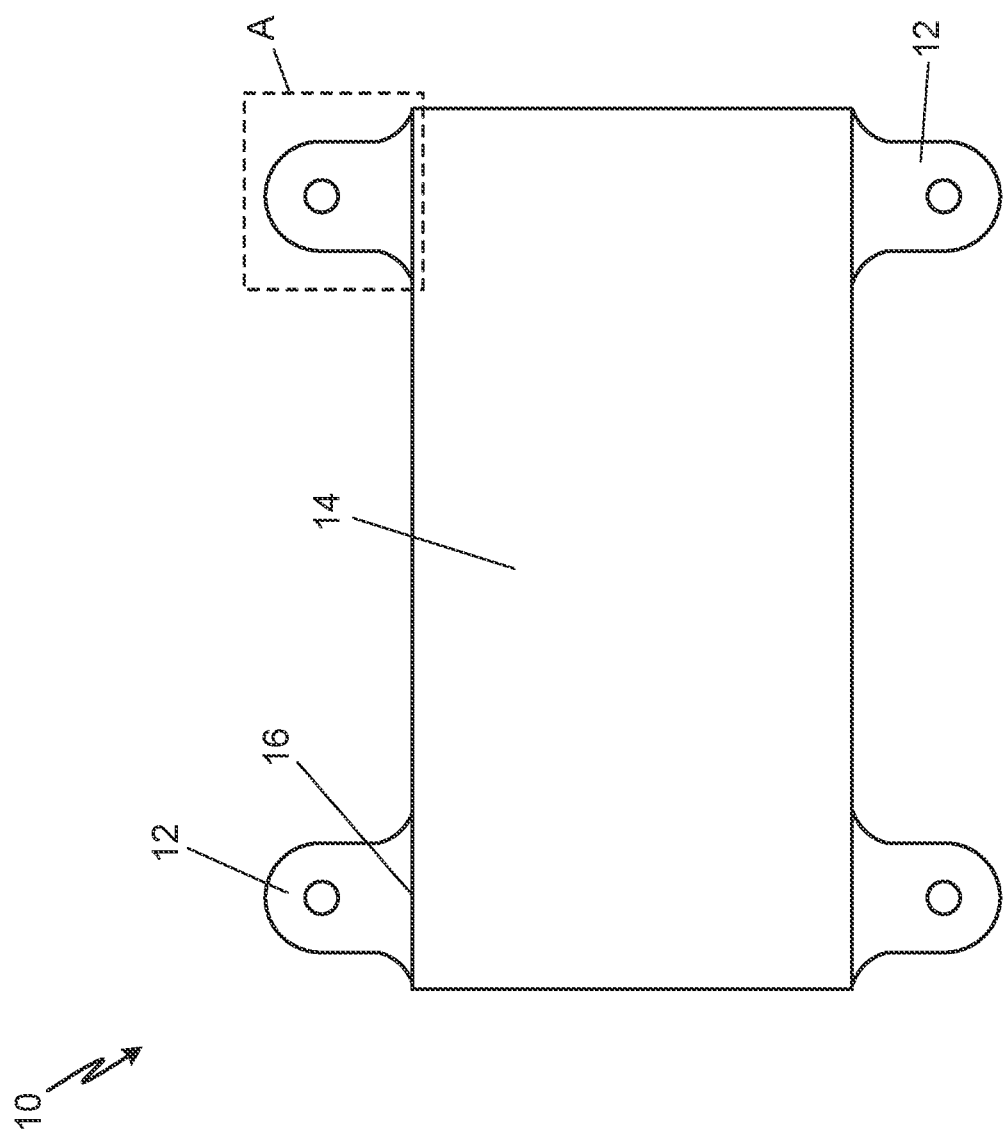

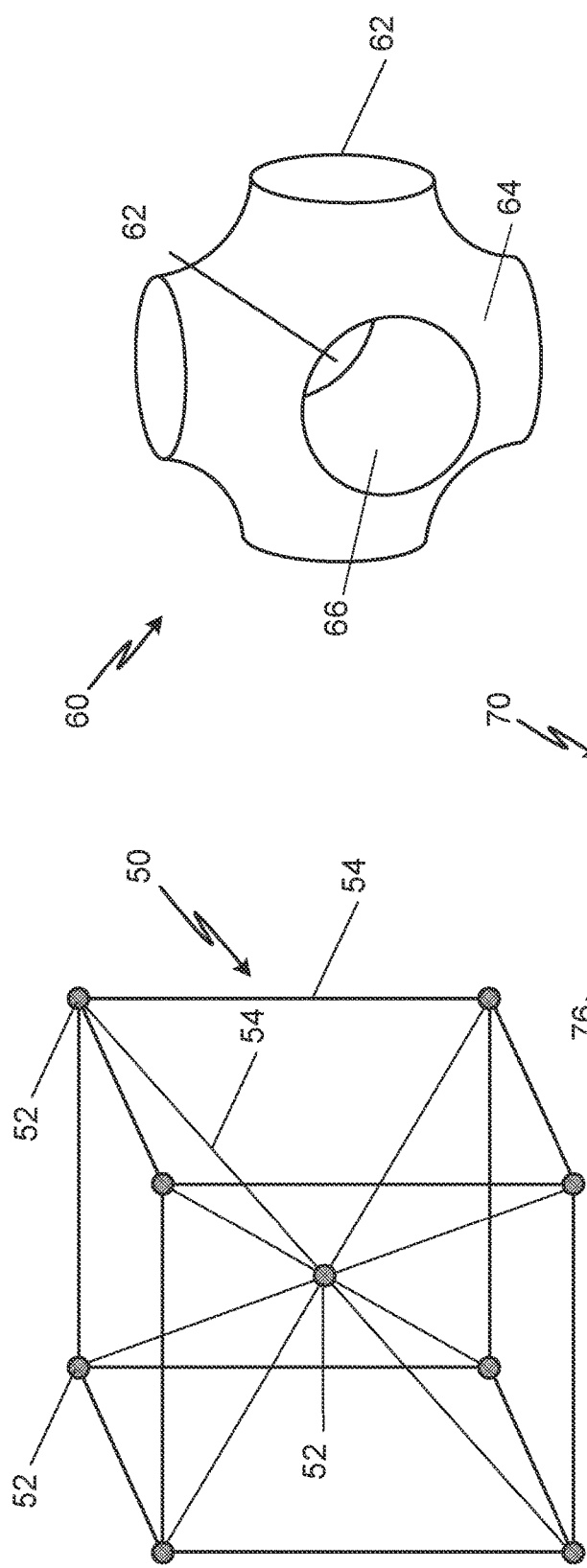
Fig. 4A
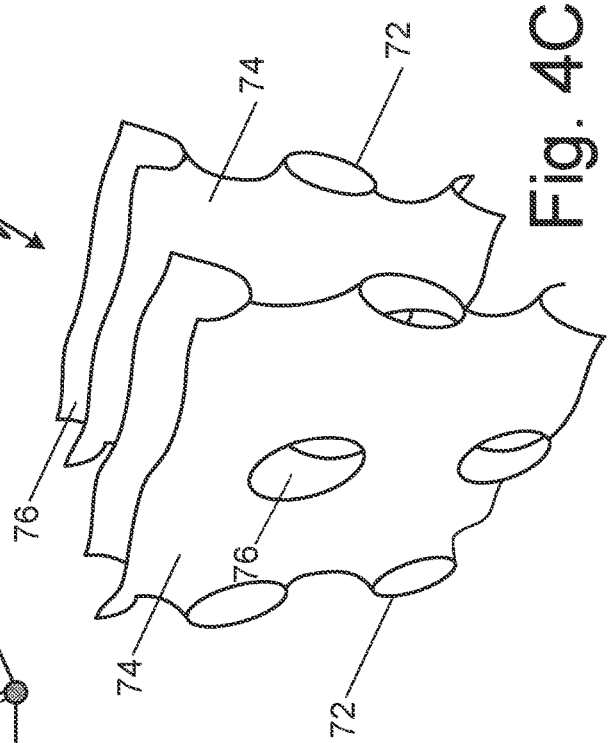
Fig. 4B
Fig. 4C

MOUNTING LUG WITH PARTICLE DAMPING AND METHOD OF MANUFACTURE

BACKGROUND

This application relates to mounting lugs on aircraft components and, more specifically, aerospace components with lugs containing particle damping media.

Components for vehicles (for example, aircraft and automobiles) are subject to random and periodic vibration and shock from a variety of sources. An example component would be a heat exchanger bolted to an engine through a mounting lug on the component. Mounting lugs are typically solid and transfer vibrations and shock to the component. Loading from shock and vibration can limit strength and lifespan of the component. Transmission of shock and vibrations through a component can be attenuated using active and passive techniques. One passive technique is using particle collisions to reduce transmissions of vibrational energy.

Components are also typically additively manufactured using powder bed fusion, where parts are built in a layerwise fashion by locally solidifying metal powder. Some powder is entrapped in solid structures. Afterwards, the entrapped powder is generally removed from the solid structures. Removing trapped powder requires extra processing and making openings in a solid component which increases interface joined regions and decreases strength of a component.

SUMMARY

A vibration damping component for a vehicle includes a housing, and a mounting lug attached to the housing. The mounting lug includes an outer shell with a top, a bottom, and sides. The mounting lug also includes a bore through the outer shell from the top to the bottom. The mounting lug also includes a cavity, an interior lattice, and a damping media. The outer shell and the bore enclose the cavity. The interior lattice is within the cavity and stiffens the mounting lug. The damping media is enclosed in the cavity and between solid portions of the interior lattice.

A method of additively manufacturing a vehicular component with a mounting lug having vibrational damping media includes additively manufacturing the component which includes a housing and a mounting lug. Additively manufacturing the mounting lug includes encasing a build powder in an outer shell of the mounting lug. The method also includes heating the component to densify solid portions of the component. Heating the component also maintains the granular structure of the build powder encased in the mounting lug. The method also includes finishing a surface of the component.

A method of manufacturing an aerospace component with a mounting lug having vibrational damping media includes additively manufacturing the component with a monolithic mounting lug. The method also includes heating the component to remove residual stress in the component. The method also includes removing build powder from the component. The method also includes heating the component to create a desired microstructure in solidified portions of the component. The method also includes filling the mounting lug with a secondary powder. The method also includes sealing the secondary powder in the mounting lug. The method also includes finishing a surface of the component.

BRIEF DESCRIPTION OF THE DRAWINGS

FIG. 2 is a top view of the component showing four mounting lugs.

FIG. 4A is a schematic of a first embodiment of an example interior lattice of the mounting lug.

FIG. 4B is a schematic of a second embodiment of an example interior lattice of the mounting lug.

FIG. 4C is a schematic of a third embodiment of an example interior lattice of the mounting lug.

DETAILED DESCRIPTION

Vehicles include, for example, aircraft such as airplanes and helicopters, automobiles, and watercraft. Vehicles have engines with components mounted to them and experience turbulent conditions. A component in a vehicle can include a heat exchanger or fuel control unit, for example. Components are bolted onto an engine using mounting lugs attached to the component. Such components experience vibrations from the engine and vehicle running. The components also undergo shock when the vehicle hits a rough patch such as turbulence.

Particle damping systems in the mounting lugs can attenuate vibration and shock experienced by the component. Particle damping systems include cavities that house internal lattices and particulate media to absorb kinetic energy created from vibrations and shocks. Kinetic energy is absorbed by friction loss, acoustic wave propagations, and momentum exchange of particles. Kinetic energy is also absorbed by collisions between the media and interior walls of the cavity. Particle damping systems are effective, durable, and economical due to the simple design and implementation. A mounting lug with a particle damping system for use in a vehicle component will be discussed in relation to FIGS. 1-4C. Methods of additively manufacturing the mounting lug will be discussed in relation to FIGS. 5-7

Figure 1:
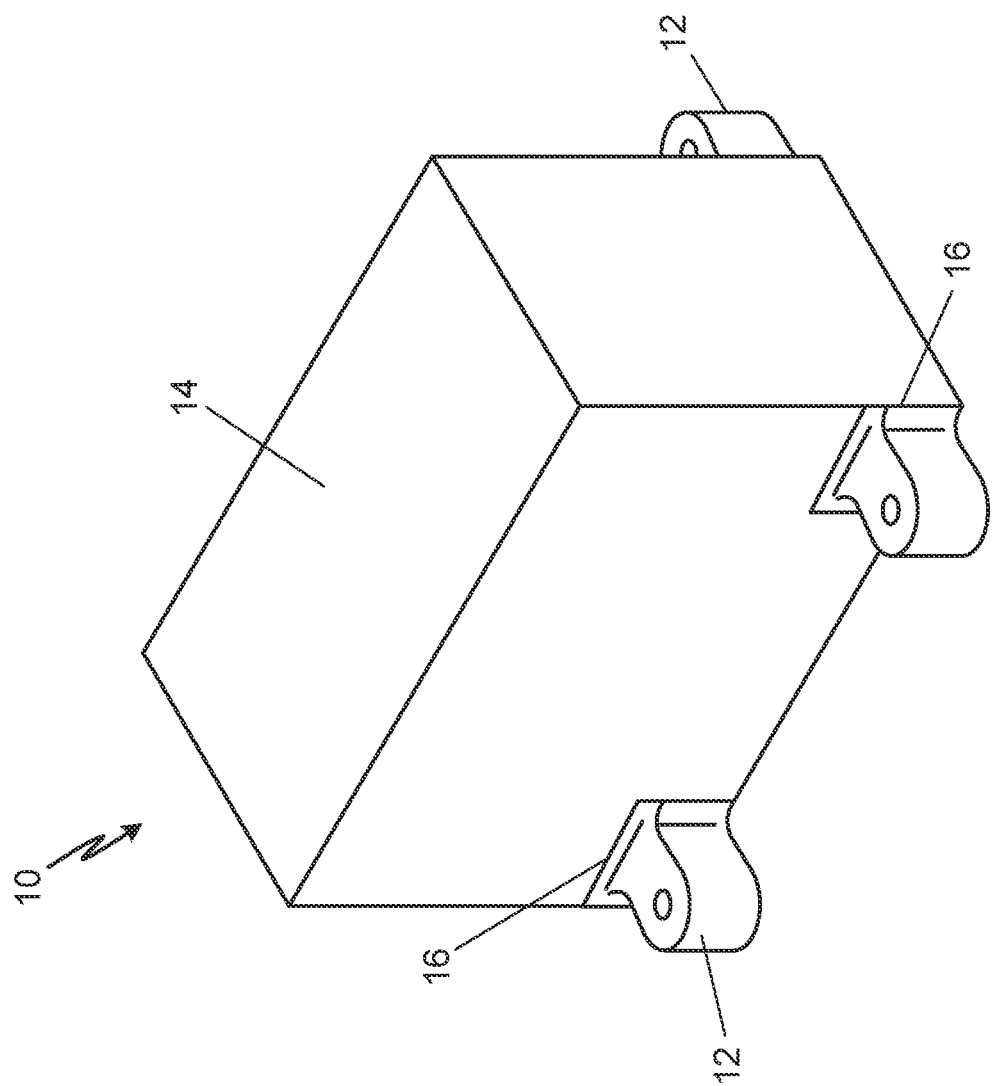
FIG. 1 is an isometric view of a component with mounting lugs.

FIG. 1 is an isometric view of component 10 with mounting lugs 12. FIG. 2 is a top view of component 10 with mounting lugs 12. FIGS. 1 and 2 will be discussed together. Component 10 includes component housing 14 with mounting lugs 12 attached at joined region 16. FIG. 2 also includes box A around one mounting lug 12.

Component 10 is a generic component that is mounted in an aircraft or other type of vehicle. For example, component 10 can be a heat exchanger mounted on an aircraft engine as part of an environmental control system. Component 10 can also be a fuel control unit attached to an aircraft engine. Component 10 can be for any type of vehicle including automobiles and watercraft in addition to aerospace vehicles.

Component 10 includes mounting lugs 12 and housing 14. Housing 14 contains pieces of component 10. Housing 14 is shaped as a generic rectangular prism in FIGS. 1-2. Housing 14 can have any shape necessary to contain the pieces of component 10 including cylindrical and irregular shapes, as examples. Each mounting lug 12 is positioned in a bottom corner of housing 14. Mounting lugs 12 are typically evenly distributed around component 10. However, mounting lugs 12 can be positioned around component 10 as necessary for specific shapes of housing 14 or mounting requirements. Mounting lugs 12 are positioned to mate with other components in the aircraft or other vehicle. For example, if component 10 is a heat exchanger that is mounted onto an air cycle machine in an aircraft, mounting lugs 12 can be positioned on housing 14 of component 10 to easily mate with positions on the air cycle machine. Such arrangements may be irregularly spaced and on different surfaces of housing 14. Mounting lugs 12 attach to housing 14 at joined regions 16. In component 10, joined regions 16 are relatively flat. However, joined regions 16 can be different shapes depending on the shape of housing 14. As an example, if housing 14 is cylindrical, joined regions 16 can be curved to attach mounting lugs 12 onto curved sides of housing 14. Mounting lugs 12 and housing 14 are integrally formed such that component 10 is a monolithic component. As such, joined regions 16 in FIGS. 1-3B are illustrative.

Mounting lugs 12 and housing 14 are made by an additive manufacturing process. Additive manufacturing processes include powder bed fusion, direct metal laser sintering, electron beam sintering. Mounting lugs 12 and housing 14 are monolithic in component 10 in that they are made and attached at the same time by the same process and from the same materials. Mounting lug 12 is also monolithic, meaning all individual pieces of mounting lug 12 are additively made at once from the same material.

Mounting lugs 12 are mostly hollow and include a particle damping system in an interior cavity. Mounting lugs 12 also include an interior lattice (or "infill"), which provides appropriate stiffness. The particle damping system in mounting lugs 12 will be discussed in more detail in relation to FIGS. 3A-3B below. The particle damping system in mounting lugs 12 reduces transmission of vibration from the engine to component 10, prolonging lifespan of component 10. The particle damping system in mounting lugs 12 also absorbs kinetic energy from shocks experienced by the vehicle, which increases lifespan and load tolerances for component 10.

Figure 3B:
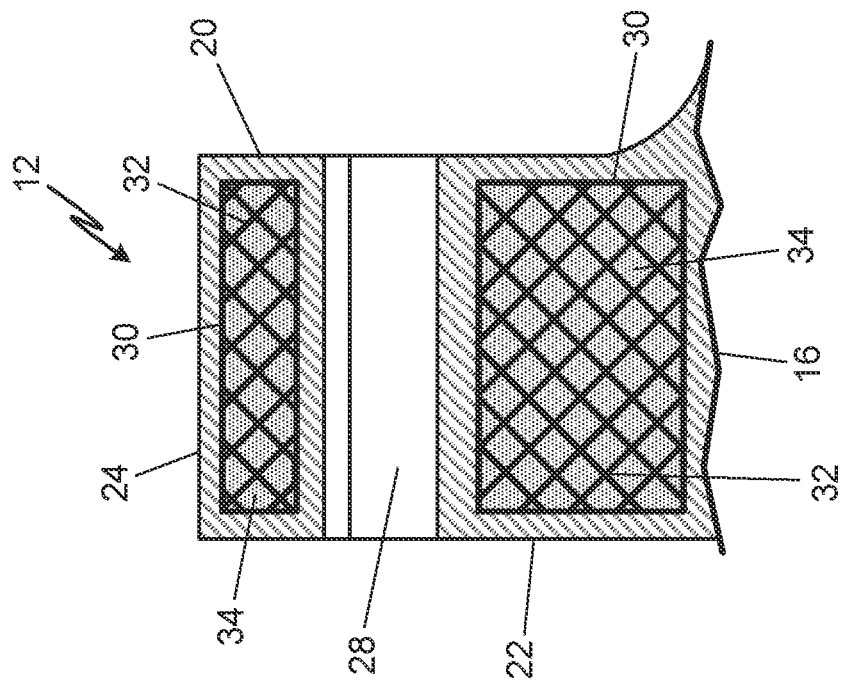
FIG. 3B is a cross-sectional view of the mounting lug taken along line B-B of FIG. 3A.
Figure 3A:
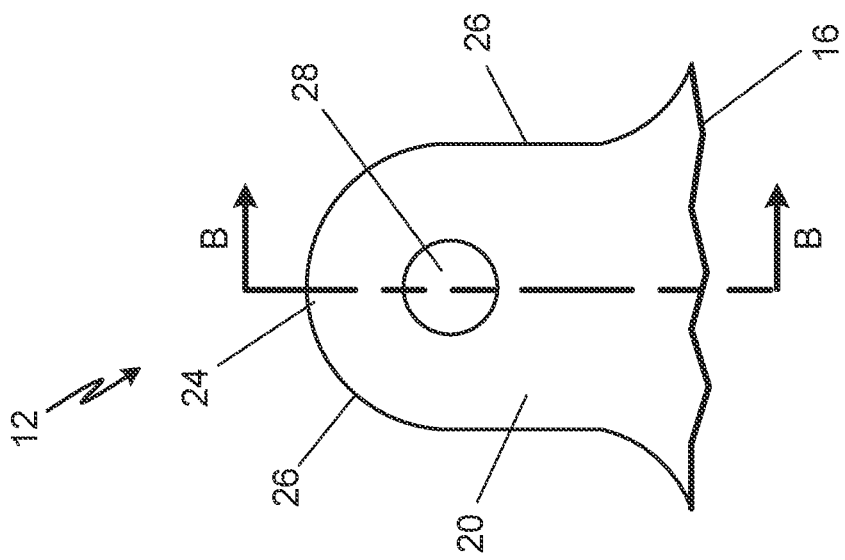
FIG. 3A is a top view of one mounting lug and includes line B-B.

FIG. 3A is a top view of mounting lug 12. FIG. 3B is a cross-sectional view of mounting lug 12 taken along line B-B of FIG. 3A. FIGS. 3A-3B will be discussed together. Mounting lug 12 includes joined region 16, top 20, bottom 22 (shown in FIG. 3B), front 24, and sides 26 (shown in FIG. 3A). Mounting lug 12 also includes bore 28, cavity 30 (shown in FIG. 3B), internal lattice 32 (shown in FIG. 3B), and damping media 34 (shown in FIG. 3B).

Mounting lug 12 includes top 20, bottom 22, front 24, and sides 26. Top 20 and bottom 22 are opposing sides of mounting lug 12. Top 20 and bottom 22 are both adjacent with joined region 16 where mounting lug 12 meets housing 14 of component 10 (shown in FIGS. 1-2). Front 24 and sides 26 are adjacent to and attach to both top 20 and bottom 22. Front 24 is opposite joined region 16. Sides 26 are adjacent to joined region 16. A fillet is located at joined region 16 adjacent to top 20 and sides 26. Bottom 22 of mounting lug 12 does not include a fillet and is flush with a bottom of component 10 (shown in FIG. 1). Top 20, bottom 22, front 24, and sides 26 along with joined region 16 make up an outer shell of mounting lug 12. Mounting lug 12 has a solid, continuous outer surface.

Bore 28 runs through mounting lug 12 from top 20 to bottom 22. Bore 28 is positioned in mounting lug 12 near front 24 and between sides 26. A central axis through the bore 28 runs approximately perpendicular to top 20 of lug. Bore 28 can have alternative positions through mounting lug 12, however bore 28 is positioned so when a bolt positioned through bore 28 is loaded in tension and has no bending or minimal bending. Sides of bore 28 are solid and are contiguous with the outer surfaces of top 20 and bottom 22 of mounting lug 12.

Mounting lug 12 also includes cavity 30, internal lattice 32, and damping media 34. Cavity 30 is a hollow portion in mounting lug 12. A solid outer margin extends from joined region 16, top 20, bottom 22, front 24, sides 26, and bore 28 to enclose cavity 30. Internal lattice 32 is located inside cavity 30. Internal lattice 32 is a solid, continuous structure within cavity 30. Internal lattice 32 extends from an internal wall of cavity 30 near top 20 to an internal wall of cavity 30 near bottom 22. Internal lattice 32 also extends between an internal wall of cavity 30 near joined region 16 to an internal wall of cavity 30 near front 24. Damping media 34 is inside of cavity 30 and fills empty space around internal lattice 32. Damping media 34 is a loose, granular media and can have, for example, an average particle size between fifteen (15) micrometers and sixty-three (63) micrometers. Damping media 34 is in cavity 30 of mounting lug 12 around internal lattice 32.

Mounting lug 12 is attached to housing 14 of component 10 at joined region 16 (as shown in FIGS. 1-2) to help mount component 10 onto another structure. Cavity 30, internal lattice 32, and damping media 34 make up a particle damping system in mounting lug 12. Cavity 30 encloses damping media 34 within mounting lug 12. Interior walls of cavity 30 also provide surfaces for collisions with damping media 34 to dampen kinetic energy passed from the vehicle into component 10.

Internal lattice 32 stiffens mounting lug 12 and provides additional surfaces for collisions with damping media 34. Internal lattice 32 is also lightweight, which reduces total weight of mounting lug 12 compared to a mounting lug made of solid metal. Internal lattice 30 can have multiple designs and densities depending on target weight and stiffness requirements in mounting lug 12. Specific designs of internal lattice 32 will be discussed in relation to FIGS. 4A-4C below.

Damping media 34 is used as particles for damping kinetic energy from vibration and shocks transferred into mounting lug 12. As component 10 is vibrated within a vehicle, mounting lug 12 absorbs this kinetic energy. Particles of damping media 34 collide with other particles of damping media 34, internal lattice 32, and the interior walls of cavity 30. Collisions between individual pieces of damping media 34 dampen vibrations attempting to move through mounting lug 12 into component 10 dampen vibrations from a combination of loss mechanisms including momentum exchange, friction, and acoustic radiation between particles of damping media 34. Similarly, collisions between damping media 34 and internal lattice 32 or the walls of cavity 30 also dissipate energy by momentum exchanger, friction, and acoustic radiation. Damping media 34 is less dense in cavity 30 of mounting lug 12 than metal making up a solid lug, meaning damping media 34 contributes to a lighter weight lug 12 than a solid lug of a similar size and shape.

The damping system in mounting lug 12 is an effective, durable, and economical system for reducing vibrations that pass through mounting lug 12 into component. The damping system including cavity 30, internal lattice 32, and damping media 34, reduces potential damage to component 10. This increases the lifespan of component 10 including mounting lugs 12 because vibrational waves are attenuated. Further, internal lattice 32 provides adequate stiffness to mounting lug 12 while reducing overall weight.

FIG. 4A shows a schematic of lattice unit cell 50 which is a first embodiment of a unit cell that can be repeated used as interior lattice 32 (shown in FIG. 3B). Unit cell 50 is a body-centered cube which, when repeated, creates a body-centered cubic lattice design. Unit cell 50 includes lattice points 52 and support structures 54. In FIG. 4A, lattice points 52 are exaggerated for better visibility. When unit cell 50 is repeated and used as interior lattice 32, lattice points 52 have diameters equivalent to diameters of support structures 54 so that lattice points 52 are identifiable only as places where support structures 54 meet.

Unit cell 50 shown in FIG. 4A is a cubic unit cell. Generally, in a lattice, a unit cell is the smallest, non-repeating unit. Unit cells in lattices can be infinitely repeated to create the lattice structure. Unit cell 50 shown in FIG. 4A repeats as necessary to fill cavity 30 in mounting lug 12 (shown in FIG. 3A) to form interior lattice 32.

In unit cell 50, one lattice point 52 is positioned in each corner of a cube and one lattice point 52 is positioned in a center of the cube. Support structures 54 are positioned between adjacent lattice points 52. For example, one support structure 54 is between two lattice points 52 on adjacent corners of unit cell 50. In another example, one support structure 54 is between the lattice point 52 in the center of the unit cell 50 and a lattice point 52 on a corner.

Unit cell 50 is one example of a repeatable structure that can be repeatedly used for interior lattice 32 in mounting lug 12 (shown in FIG. 3B). Unit cell 50 can be additively manufactured because it fits within a 90° print window. Unit cell 50 can also be size adjusted to vary density of interior lattice 32 as necessary to increase stiffness or decrease weight. A denser lattice structure 32 is made of smaller repeating cubic unit cells 50. A denser lattice structure 32 would provide more stiffness and increases surfaces for collisions with damping media 34 (shown in FIG. 3B). A less dense lattice structure has larger unit cells 50, would be lighter, and would provide more space for an increased amount of damping media 34 in mounting lug 12.

FIG. 4B shows a schematic of polygon 60, which is a Schwarz minimal surface shape that can be repeated and used as interior lattice 32 (shown in FIG. 3B). Polygon 60 includes openings 62, exterior surface 64, and interior surface 66. Polygon 60 has a generally cubic shape where each opening 60 is oriented toward a plane of a hypothetical cube that contains polygon 60. Interior surface 64 and exterior surface 66 are opposite surfaces that connect openings 60 to one another.

Polygon 60 is a Schwarz P (or Schwarz Primitive) polygon. Generally, Schwarz minimal surfaces are surfaces made of repeatable polygons, for example, polygon 60. When polygon 60 meets a plane at a right angle, a mirror image of polygon 60 can connect at the plane. Polygon 60 meets planes at right angles where openings 60 are located. As such, a repeatable lattice of polygons 60 can be used as interior lattice 32 in mounting lug 12.

When repeated, polygon 60 creates one embodiment of interior lattice 32 with a high surface-to-volume ratio, which allows for many collisions with damping media 34. Polygon 60 also creates an embodiment of interior lattice 32 with high porosity, allowing for damping media 34 to infiltrate interior lattice 32. Polygon 60 can also vary in density depending on the size. Smaller polygons 60 allow for more repeatable polygons 60 and a denser interior lattice 32 with an increased stiffness and more surface area for collisions. Larger polygons 60 allow for fewer polygons in cavity 30, a less dense interior lattice 32, and a lighter mounting lug 12. Further, an interior lattice 32 made of polygons 60 can be built in the 90° build window used for additive manufacturing, specifically powder bed fusion.

FIG. 4C shows a schematic of polygon 70, which is a Schwarz minimal surface shape that can be repeated and used as interior lattice 32 (shown in FIG. 3B). Polygon 70 includes openings 72, exterior surface 74, and interior surface 76. Openings 72 of polygon 70 are connected by interior surface 74 and exterior surface 76, which are opposite surfaces.

Polygon 70 is a Schwarz CLP (or Schwarz Crossed Layers of Parallels) lattice structure. Where polygon 70 meets a plane at a right angle, a mirror image of polygon 70 can connect. In Polygon 70, planes are indicated by openings 72. Polygons can also be added to a top or a bottom of polygon 70. A repeatable lattice of polygons 70 can be used as interior lattice 32 in mounting lug.

When repeated, polygon 70 creates one embodiment of interior lattice 32. Polygon 70 can also vary in density depending on the size. Smaller polygons 70 allow for more repeatable polygons 70 and a denser interior lattice 32 with an increased stiffness and more surface area for collisions. Larger polygons 70 allow for fewer polygons in cavity 30, a less dense interior lattice 32, and a lighter mounting lug 12. Further, an interior lattice 32 made of polygons 70 can be built in the 90° build window used for additive manufacturing, specifically powder bed fusion.

Figure 5:
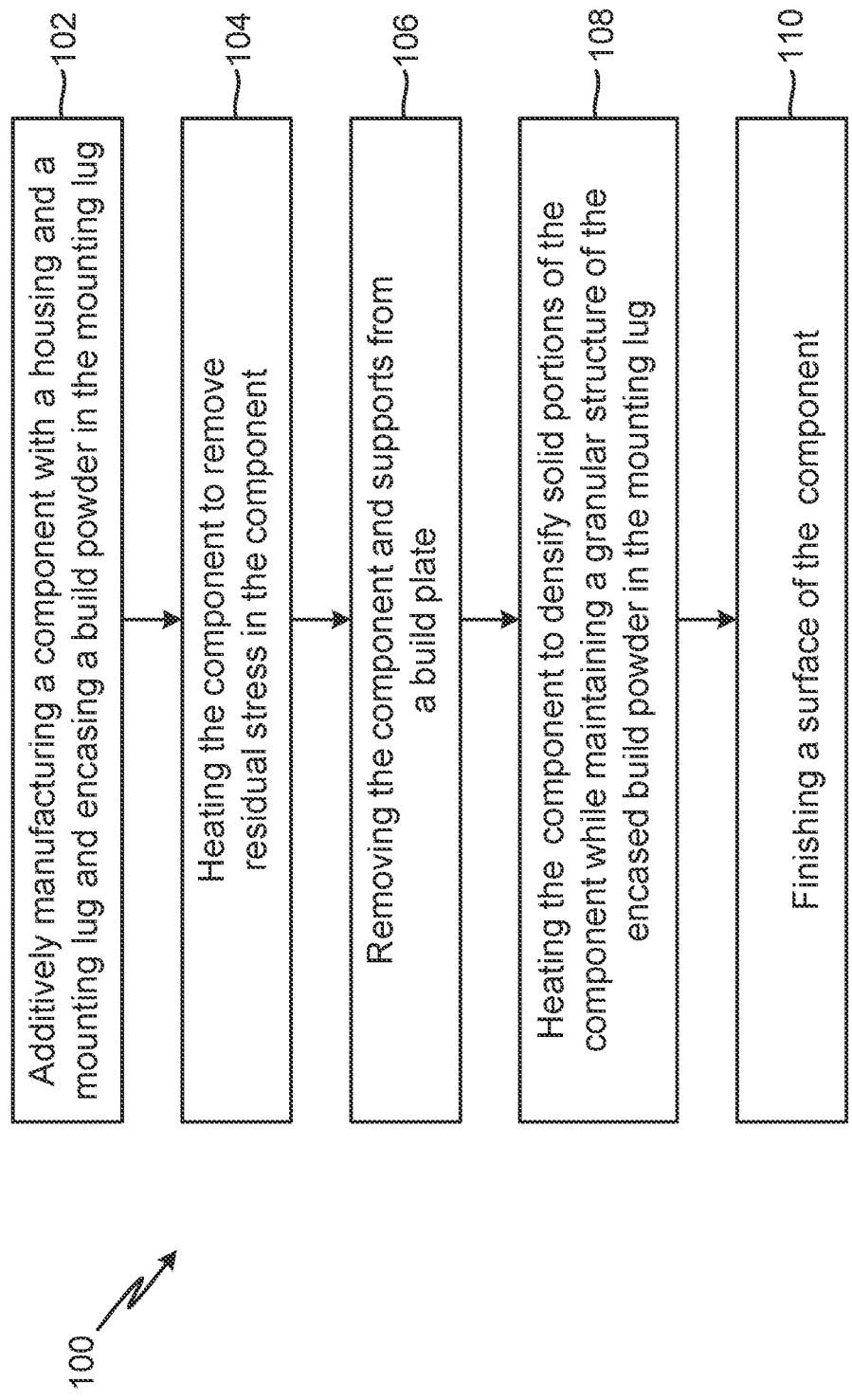
FIG. 5 is a flow chart showing a method of additively manufacturing the component of FIGS. 1-3A.

FIG. 5 is a flow chart showing method 100 of additively manufacturing component 10 of FIGS. 1-4C. Method 100 includes steps 102-110. Method 100 will be described in relation to manufacturing component 10 of FIGS. 1-3B and will use corresponding reference numerals. Method 100 is a generic method to additively manufacture component 10 so damping material 34 remains granular once component 10 is finished. Specific methods (method 120, method 140, and method 160) will be discussed in FIGS. 6A-6C (respectively) below.

Step 102 includes additively manufacturing component 10 and encasing a build powder in mounting lug 12. Step 102 uses an additive manufacturing process (for example, powder bed fusion) to form component 10 layer by layer. Additively manufacturing mounting lug 12 simultaneously creates the particle damping system, including cavity 30, internal lattice 32, and damping media 34, with the outer shell of mounting lug 12. When additive manufacturing in general, each additively manufactured layer creates a new horizontal build plane to which a subsequent layer of component 10 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. The defined vertical increments in additive manufacturing (also called "layer heights") are typically thirty (30) micrometers to one-hundred twenty (120) micrometers and are on the same order as the average particle side as the additive manufacturing powder. Therefore, component 10 can be additively manufactured as a single, monolithic unit or part. Further, build powder used during additive manufacturing is left in place until the end of the additive manufacturing process. As mounting lug 12 is built vertically, build powder remains unfused within cavity 30 between solid portions of interior lattice 32. Build powder also remains within mounting lug 12 once a final side of mounting lug is completed. For example, if mounting lug 12 is being built from bottom 22 to top 20, build powder is encased in cavity 30 once top 20 is additively manufactured. Encasing build powder into mounting lug 12 during additive manufacturing reduces processing steps to have damping media 34 in mounting lug 12, making production more efficient.

Additively manufacturing component 10 with mounting lugs 12 also includes manufacturing interior lattice 32 in cavity 30 of mounting lug 12. As described in relation to FIGS. 3A-3B, interior lattice 32 provides stiffness to mounting lug 12. While additively manufacturing component 10, unit cells of interior lattice 32 (for example, first lattice embodiment 50 of FIG. 4A, polygons 60 of FIG. 4B, or polygons 70 of FIG. 4C) should be sized and positioned provide appropriate stiffness and weight for mounting lug 12, as discussed in relation to FIGS. 4A-4C above. Positioning and size of the unit cells of interior lattice 32 also determines how much damping media 34 is within cavity 30 and how many surfaces damping media 34 has to interact with inside mounting lug 12. During manufacturing, placement of unit cells adjacent to the walls of cavity 30 may also maximize or minimize an amount of contact between walls of cavity 30 and solid portions of internal lattice 32, as desired. Considering sizing of unit cells of internal lattice 32 in step 102 allows for interior lattice 32 to be manufactured so mounting lug 12 has optimized physical specifications to support and dampen vibrations through component 10.

Step 104 includes heating component 10 to remove residual stress in component 10. Step 104 can also be referred to as "stress relief" in additive manufacturing. Component 10 may have residual stress due to additive manufacturing. This stress can be relieved by exposing component 10 to an elevated temperature for a specified time to remove internal stress without changing the underlying microstructure of solidified portions of mounting lug 12 (including internal lattice 32). Levels of temperature and duration of time for step 104 should be chosen to avoid fusing build powder encased in cavity 30 of mounting lug 12. The encased build powder should remain granular to be used as damping media 34. Stress relief is done in a vacuum furnace to limit oxidants reacting with component 10 during heat treatment. Depending on the alloy used, step 104 may not be necessary because certain alloys can be used in additive manufacturing that have an insignificant or non-detrimental amount of residual stress.

Step 106 includes removing component 10 and supports from a build plate. A build plate is a portion of an additive manufacturing device used as a base to build component 10. Supports are structures that create stability for component 10 during additive manufacturing. In step 106, component 10 is removed from the build plate so further processing can be done outside of the additive manufacturing device.

Step 108 includes heating the component 10 to densify solid portions of component 10 while maintaining a granular structure of the encased build powder in mounting lug 12. Step 108 allows for thermal processing of component 10 while maintaining individual grains of build powder in lug 12. Thermal processing of additively manufactured components creates a desired microstructure (or crystal structure) within the solidified portions of component 10. As will be discussed in relation to method 200 of FIG. 7, loose build powder is typically removed before thermal processing. Thermal processing is typically done at both an increased temperature and pressure. Such increased temperature and pressure will solidify the build powder encased in cavity 30 and the build powder has decreased ability to be used as damping media 34. Thermal processing occurs in an environment to reduce oxidation degradation. Thermal processing utilizes a vacuum furnace to reduce oxidants surrounding component 10 during thermal processing. Thermal processing also includes cooling component 10 in a controlled environment. Gas fan quenching can be used to control the cooling of component 10. Certain alloys may not need to undergo thermal processing in step 108 because the microstructure components 10 created by additively manufacturing with those alloys have the desired grain structure without additional heat.

Method 100 retains build powder in mounting lug 12 to be used as damping media 34. Build powder is left in place during thermal processing to act as damping media 34. Thermal processing at high pressure and temperature would fuse the build powder in mounting lug 12. Processes used in step 108 are chosen to avoid sintering or fusing the encased build powder in mounting lug 12. This preserves the granular structure (or individual grains) of the build powder.

Step 108 can be completed by making modifications to a traditional thermal processing procedure. Modifications include heating component 10 at a minimum pressure (which will be discussed in relation to method 120 of FIG. 6A), heating component 10 at a lower temperature (which will be discussed in relation to method 140 of FIG. 6B), and thermally shielding mounting lugs 12 on component 10 during thermal processing (which will be discussed in relation to method 160 of FIG. 6C). The modifications can be used separately or simultaneously to preserve the granular structure of the encased build powder for use as damping media 34. Step 108 allows for creating a desired microstructure in solidified portions of component 10 to avoid metal fatigue and cracking while maintaining granularity of encased build powder. This allows encased build powder to be used as damping media 34.

Step 110 includes finishing a surface of component 10. In step 110, supports used during additive manufacturing are removed and a surface of component 10 is finished. Finishing the surface of component 10 can also include machining portions of component 10. Step 110 can also include buffing, polishing, and/or coating the surface of component to produce the desired finish on component 10. Step 110 can be used to improve fatigue performance of component 10 and control interfaces between surfaces, which is important when component 10 is a heat exchanger. Specifics of step 110 can vary depending on what component 10 is used for.

Method 100 creates component 10 with monolithic mounting lugs 12 that include build powder encased within mounting lugs 12 for use as damping media 34 Method 100 creates mounting lugs 12 with damping media 34 using fewer steps, leading to a reduced build time. Mounting lug 12 also does not have a closed opening through an outer surface into cavity 30, as would be necessary when removing and replacing build powder with damping media 34. This makes mounting lug 12 more structurally sound.

Figure 6A:
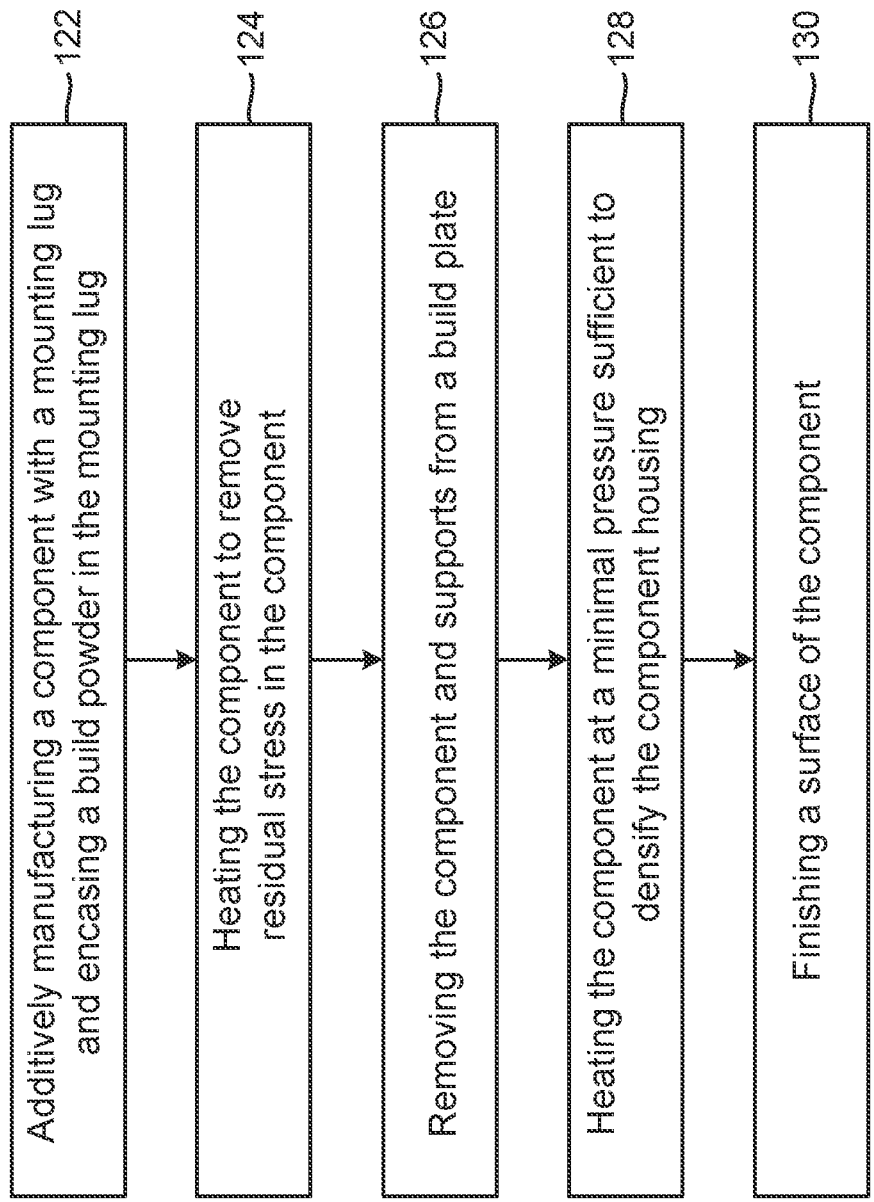
FIG. 6A is a flow chart showing a first embodiment of the method shown in FIG. 5.

FIG. 6A is a flow chart showing method 120, which is a first embodiment of method 100 (shown in FIG. 5). Method 120 includes steps 122-130. In method 120, reference numerals have been increased by an interval of twenty between comparable to steps of method 100. Further, steps 122-126 are performed as steps 102-106, respectively, in relation to method 100 of FIG. 5. Similarly, step 130 is performed as step 110 as described in relation to FIG. 5. Method 120 includes step 128, which is one possible way to thermally process component 10 while maintaining a granular structure of encased build powder to be used as damping media 34.

Step 128 of method 120 includes heating component 10 at a minimum pressure sufficient to densify housing 14. Step 128 can be used as step 108 in method 100 of FIG. 5. Step 128 is a method of thermal processing that allows build powder encased in cavity 30 of mounting lug 12 to remain granular. Step 128 includes heating component 10 at a very low pressure. Typical thermal processing includes subjecting component 10 to decreased pressure in a vacuum furnace, which minimizes reactivity and oxidation of the metal. Reducing the pressure in the vacuum furnace reduces the possibility of grains of damping media 34 fusing during thermal processing. Using the minimal pressure sufficient to heat threat component 10 and housing 14 reduces the probability of damping media 34 becoming fused. Heating in step 128 may take place over a longer period than traditional thermal processing procedures due to using lower pressure. Step 128 allows for build powder to be used as damping media 34 without extra processing steps such as removing build powder and filling mounting lug 12 with another damping media 34.

Figure 6B:
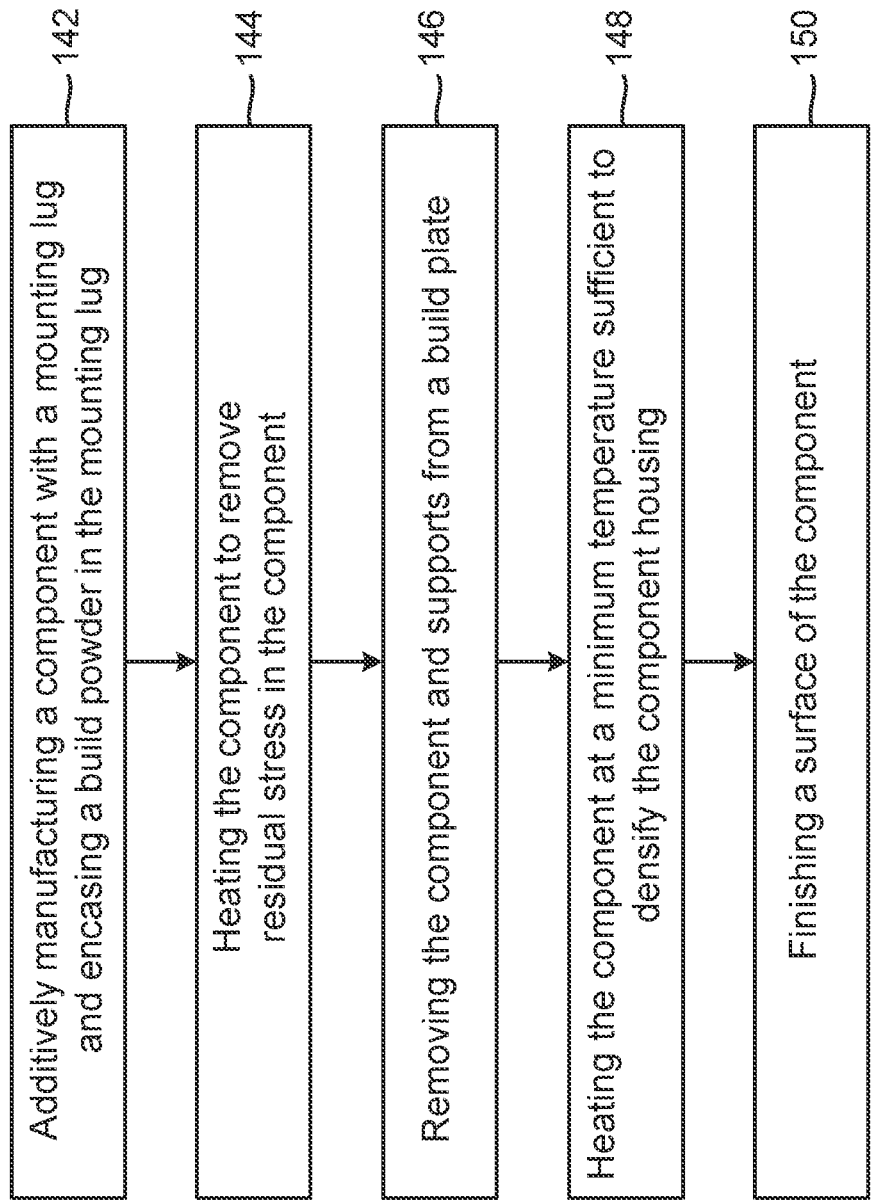
FIG. 6B is a flow chart showing a second embodiment of the method shown in FIG. 5.

FIG. 6B is a flow chart showing method 140, which is a second embodiment of method 100 shown in FIG. 5. Method 140 includes steps 142-150. Reference numerals of method 140 have been increased by an interval of forty between comparable steps of method 100. Steps 142-146 are performed as steps 102-106, respectively, as described in relation to method 100 of FIG. 5. Similarly, step 150 is performed as step 110 of method 100, as described in relation to FIG. 5. Method 140 includes step 148, which is one possible way to thermally process component 10 while maintaining a granular structure of encased build powder to be used as damping media 34.

Step 148 of method 140 heating the component at a minimum temperature sufficient to densify the component housing. Step 148 can be used as step 108 in method 100. Step 148 is a way of thermal processing to allow build powder encased in cavity 30 of mounting lug 12 to remain granular. Step 148 uses temperatures lower than in typical thermal processing to avoid build powder in mounting lug 12 from fusing. The minimum temperature is chosen based on the metal or alloy used to build component 10, the size of the component, and the desired microstructure in housing 14 of component 10. The heating in step 148 likely occurs for longer than in a typical thermal processing procedure due to the lowered temperature. An amount of time heating occurs in step 148 is also kept to a minimum to avoid melting the build powder. Step 148 allows for build powder to be used as damping media 34 without extra processing steps.

Figure 6C:
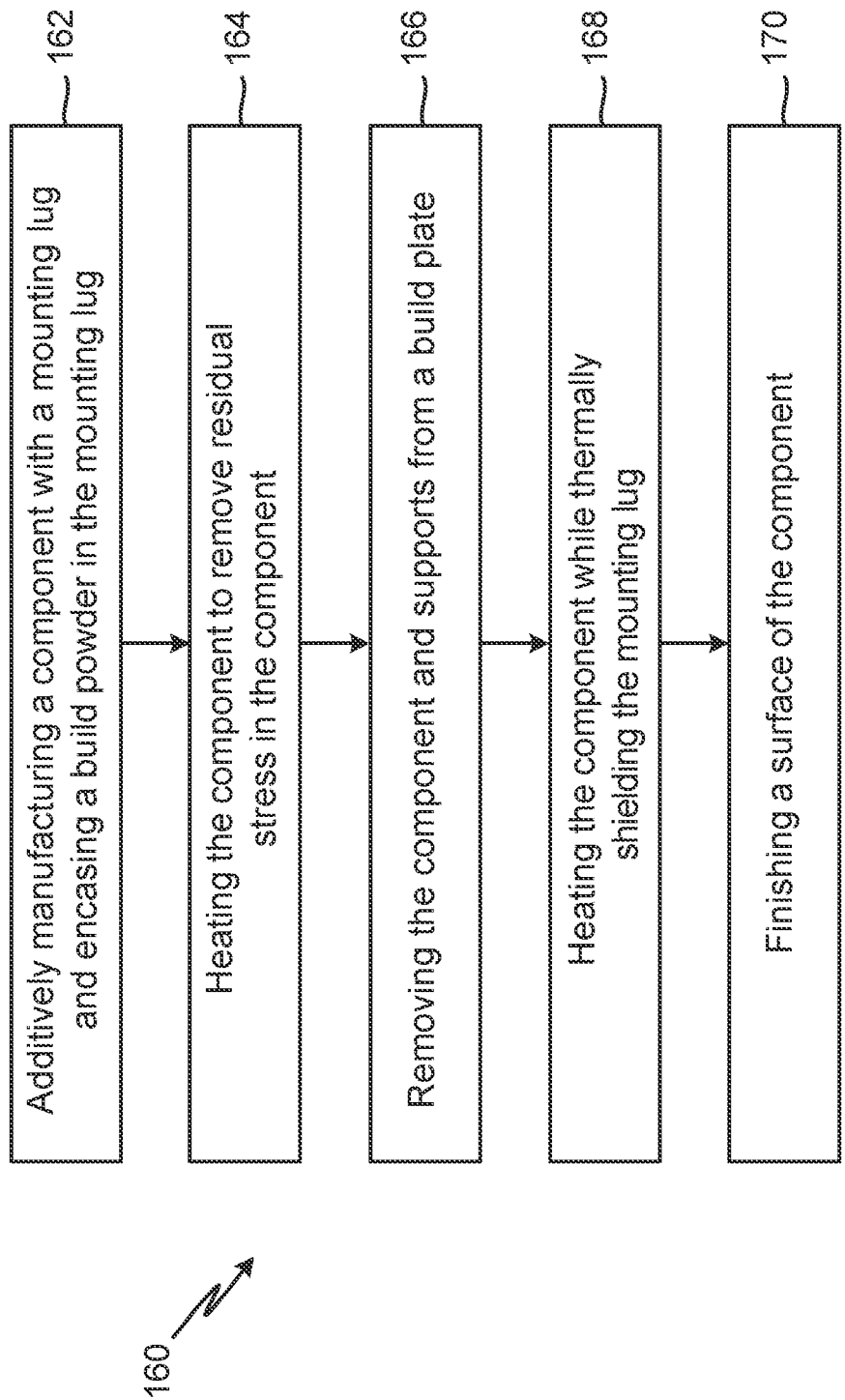
FIG. 6C is a flow chart showing a third embodiment of the method shown in FIG. 5.

FIG. 6C is a flow chart showing method 160, which is a third embodiment of method 100 shown in FIG. 5. Method 160 includes steps 162-170. Reference numerals of method 160 have been increased by an interval of sixty between comparable steps of method 100. Steps 162-166 are performed as steps 102-106 of method 100, as described in relation to FIG. 5. Similarly, step 170 is performed as step 110 of method 100, as described in relation to FIG. 5. Method 160 includes step 178, which is one possible way to thermally process component 10 while maintaining a granular structure of encased build powder to be used as damping media 34.

Step 170 of method 160 includes heating component 10 while thermally shielding mounting lug 12. Step 170 can be used as step 108 in method 100, shown in FIG. 5. Step 170 is a way of thermal processing to allow build powder encased in cavity 30 of mounting lug 12 to remain granular. Step 170 uses a thermal shield around mounting lug 12. A thermal shield can be built around mounting lug 12 during step 164, which includes additively manufacturing component 10. Alternatively, a shield can be placed around mounting lug 12 before thermal processing in step 170 begins. Shields can be removed after heating is finished during step 152 when other supports are removed, as described in step 110 of method 100 in relation to FIG. 5. Placing a thermal shield around mounting lug 12 allows for thermal processing of component 10 without solidifying build powder in mounting lug 12. Build powder can then be used as damping media 34 without additional processing, as described in relation to method 100. Step 128, step 148, and step 170 can be used in conjunction with one another to preserve the granular structure of build powder encased in mounting lug 12 during thermal processing.

Figure 7:
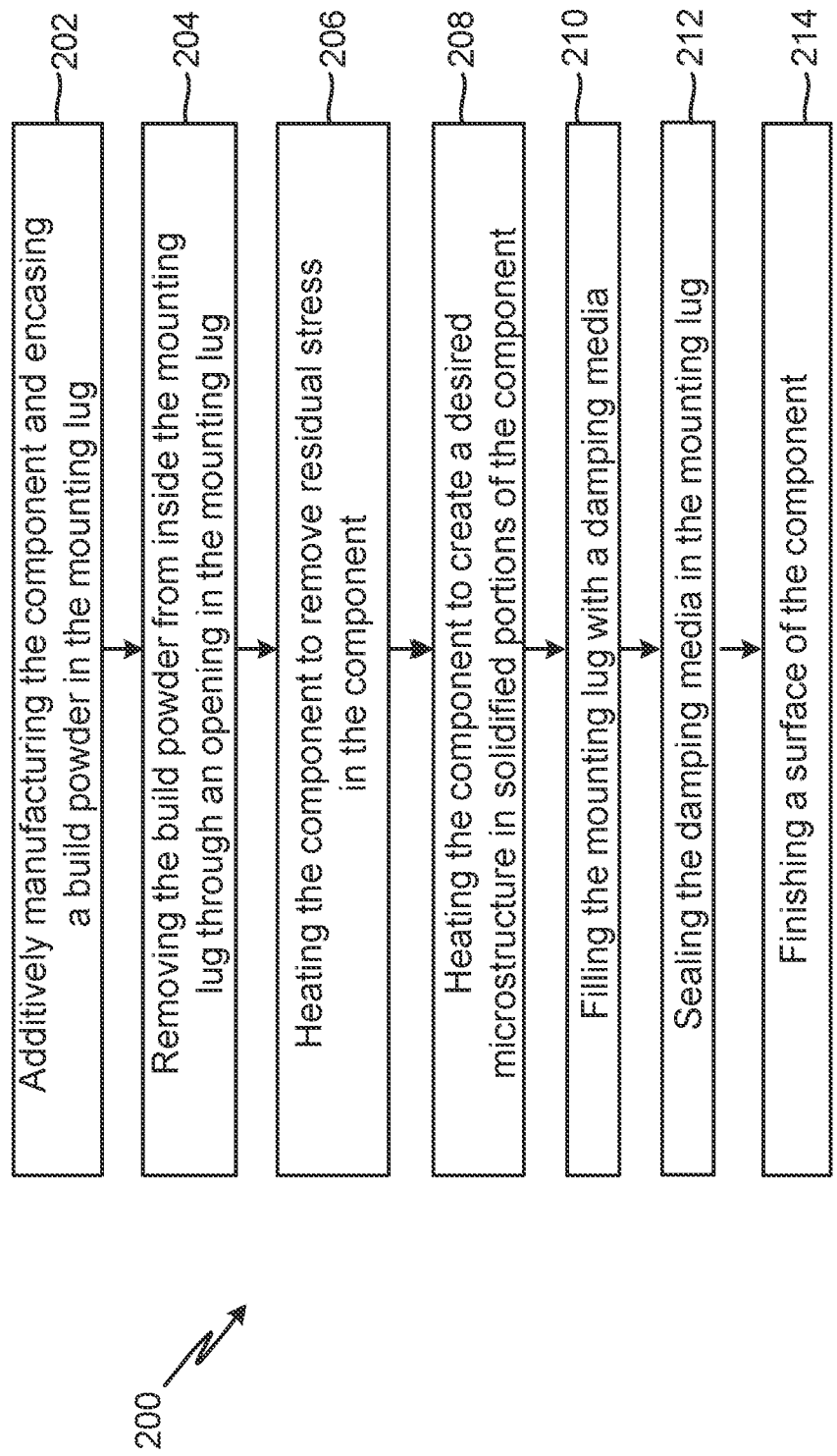
FIG. 7 is a flow chart showing an alternate embodiment of a process to additively manufacture the aerospace component of FIG. 1.

FIG. 7 is a flow chart showing method 200, which is an alternate embodiment of a process to additively manufacture component 10. Method 200 includes steps 202-218. Method 200 creates component 10

Step 202 includes additively manufacturing component 10 and encasing a build powder in mounting lug 12. Step 202 can be performed as step 102 is performed, as discussed in relation to method 100 of FIG. 5.

Step 204 includes removing the build powder from inside mounting lug 12 through an opening in mounting lug 12. Build powder can be removed from mounting lug 12 by creating an opening into cavity 30 through a side of bore 28 or in front 24 of mounting lug 12. Multiple openings can be created. Structure and placement of interior lattice 32 may need to be altered to ensure the opening can access cavity. Placement of the opening may also need to be chosen strategically to avoid solid portions of interior lattice 32. Build powder can be removed through the opening. Moving, rotating, or shaking component 10 may be necessary to adequately remove build powder from mounting lug 12. Removing build powder at this stage allows for using typical thermal treatment processes to manufacture component 10.

Step 206 includes heating component 10 to remove residual stress in component 10. Step 206 can be performed as step 104, as described in relation to method 100 of FIG. 5.

Step 208 includes heating component 10 to create a desired microstructure in solidified portions of component 10. Step 208 can be performed as any typical thermal processing procedure is done for additively manufactured structures because the build powder has been removed from mounting lug 12. As such, step 208 can use typical temperature, pressure, and time constraints to create a desired microstructure in component 12 without taking care to avoid solidifying damping media 34 in mounting lug 12.

Step 210 includes filling mounting lug 12 with damping media 34. Step 210 allows for placement of a secondary powder to be used as damping media 34 in mounting lug 12. Using a secondary powder for damping media 34 allows for using a less expensive powder than additive manufacturing build powder. This can increase economy of damping powder 34. The secondary powder can also have a different size than the build powder used for additive manufacturing powder (which is typically between 15 micrometers and 63 micrometers). This allows for choosing a build powder without considering the needs of damping media 34. Stated another way, damping media 34 can be chosen without limitations on the secondary powder being adequate for additive manufacturing. The secondary powder used as damping media 34 can also fill cavity 30 less than method 100 fills cavity because the secondary powder is not supporting build powder. Method 100 completely fills cavity 30. The secondary powder can fill cavity 30 less than completely full, allowing for more choices when designing mounting lug 12.

Step 212 includes sealing damping media 34 in mounting lug 12. Step 212 closes cavity 30 to hold damping media 34 within mounting lug 12. Sealing can be done by an appropriate method. For example, a plug or patch can be welded over the opening.

Step 214 includes finishing a surface of component 10. Step 214 can be performed as step 110 in method 100, as discussed in relation to FIG. 5.

Method 200 creates mounting lug 12 which can have a different damping media 34 than build powder used for additively manufacturing component 10. This allows for choosing damping media 34 for its own properties (material, size, and cost, for example) without having to consider additive manufacturing requirements. Method 200 also allows for under filling mounting lug 12 with damping media 34, as necessary. This is compared to method 100, which creates mounting lug 12 that is completely full of damping media 34. Method 200 allows for more flexibility in designing mounting lug 12.

Discussion of Possible Embodiments

The following are non-exclusive descriptions of possible embodiments of the present invention.

A vibration damping component for a vehicle includes a housing, and a mounting lug attached to the housing. The mounting lug includes an outer shell with a top, a bottom, and sides. The mounting lug also includes a bore through the outer shell from the top to the bottom. The mounting lug also includes a cavity, an interior lattice, and a damping media. The outer shell and the bore enclose the cavity. The interior lattice is within the cavity and stiffens the mounting lug. The damping media is enclosed in the cavity and between solid portions of the interior lattice.

The component of the preceding paragraph can optionally include, additionally and/or alternatively, any one or more of the following features, configurations and/or additional components:

A further embodiment of the foregoing component, wherein the mounting lug is monolithic with the housing.

A further embodiment of any of the foregoing components, wherein the mounting lug is monolithic.

A further embodiment of any of the foregoing components, wherein the component is additively manufactured.

A further embodiment of any of the foregoing components, wherein the damping media is entrapped additive manufacturing powder which retains a granular structure after the component has undergone thermal processing.

A further embodiment of any of the foregoing components, wherein the damping media has a particle size between 15 micrometers and 63 micrometers.

A further embodiment of any of the foregoing components, wherein symmetric shapes are repeated and connected to form the interior lattice within the cavity.

A further embodiment of any of the foregoing components, wherein the interior lattice is a body-centered cubic lattice.

A further embodiment of any of the foregoing components, wherein the interior lattice is made of Schwarz P minimal surface polygons.

A further embodiment of any of the foregoing components, wherein the component is a heat exchanger.

A further embodiment of any of the foregoing components, wherein the interior lattice is made of repeating Schwarz CLP minimal surface polygons.

A method of additively manufacturing a vehicular component with a mounting lug having vibrational damping media includes additively manufacturing the component which includes a housing and a mounting lug. Additively manufacturing the mounting lug includes encasing a build powder in an outer shell of the mounting lug. The method also includes heating the component to densify solid portions of the component while maintaining the granular structure of the build powder encased in the mounting lug. The method also includes finishing a surface of the component.

The method of the preceding paragraph can optionally include, additionally and/or alternatively, any one or more of the following features, configurations and/or additional components:

A further embodiment of the foregoing method, wherein the mounting lug is monolithic with a housing for the component.

A further embodiment of any of the foregoing methods, wherein the mounting lug includes a housing, and a mounting lug attached to the housing. The mounting lug includes an outer shell with a top, a bottom, and sides. The mounting lug also includes a bore through the outer shell from the top to the bottom. The mounting lug also includes a cavity, an interior lattice, and a damping media. The outer shell and the bore enclose the cavity. The interior lattice is within the cavity and stiffens the mounting lug. The damping media is enclosed in the cavity and between solid portions of the interior lattice.

A further embodiment of any of the foregoing methods, wherein the mounting lug is monolithic with the housing.

A further embodiment of any of the foregoing methods, wherein the build powder from additive manufacturing is the damping media in the lug.

A further embodiment of any of the foregoing methods, wherein the damping media has a particle size between 15 micrometers and 63 micrometers.

A further embodiment of any of the foregoing methods, and further including heating the component to remove residual stress in the component at a temperature that maintains a granular structure of the encased build powder.

A further embodiment of any of the foregoing methods, wherein heating the component to densify solid portions of the component while maintaining the granular structure of the build powder encased in the mounting lug includes heating the component at a minimum pressure sufficient to densify the housing of the component.

A further embodiment of any of the foregoing methods, wherein heating the component to densify solid portions of the component while maintaining the granular structure of the build powder encased in the mounting lug includes heating the component at a minimum temperature sufficient to densify the housing of the component.

A further embodiment of any of the foregoing methods, wherein heating the component to densify solid portions of the component while maintaining the granular structure of the build powder encased in the mounting lug includes heating the component while thermally shielding the mounting lug.

A further embodiment of any of the foregoing methods, wherein additively manufacturing the component includes additively manufacturing the interior lattice with unit cells sized and positioned within the cavity to create surfaces for collisions with the damping media and stiffening the mounting lug.

A further embodiment of any of the foregoing methods, wherein the additive manufacturing technique is chosen from the group consisting of electron beam melting, powder bed fusion, selective laser sintering, and combinations thereof.

A method of manufacturing an aerospace component with a mounting lug having vibrational damping media includes additively manufacturing the component with a monolithic mounting lug. The method also includes heating the component to remove residual stress in the component. The method also includes removing build powder from the component. The method also includes heating the component to create a desired microstructure in solidified portions of the component. The method also includes filling the mounting lug with a secondary powder. The method also includes sealing the secondary powder in the mounting lug. The method also includes finishing a surface of the component.

The method of the preceding paragraph can optionally include, additionally and/or alternatively, any one or more of the following features, configurations and/or additional components:

A further embodiment of the foregoing method, wherein the mounting lug includes a housing, and a mounting lug attached to the housing. The mounting lug includes an outer shell with a top, a bottom, and sides. The mounting lug also includes a bore through the outer shell from the top to the bottom. The mounting lug also includes a cavity, an interior lattice, and a damping media. The outer shell and the bore enclose the cavity. The interior lattice is within the cavity and stiffens the mounting lug. The damping media is enclosed in the cavity and between solid portions of the interior lattice.

A further embodiment of any of the foregoing methods, wherein removing entrapped build powder from the component includes creating an opening in the mounting lug to the cavity.

A further embodiment of any of the foregoing methods, wherein removing entrapped build powder from the component includes draining unsolidified build powder through the opening.

A further embodiment of any of the foregoing methods, wherein the opening is in a side of the bore.

A further embodiment of any of the foregoing methods, wherein powder is replaced in the mounting lug through the opening.

A further embodiment of any of the foregoing methods, wherein sealing the secondary powder in the mounting lug further includes closing the opening in the mounting lug.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of additively manufacturing a vehicular component with a mounting lug having vibrational damping media (34),
the method comprising:
Additively manufacturing the component including a housing (14) and the mounting lug (12),
wherein additively manufacturing the mounting lug (12) includes encasing a powder in an outer shell of the mounting lug (12);
heating the component to densify solid portions of the component while maintaining the granular structure of the build powder encased in the mounting lug (12); and
finishing a surface of the component.

2. The method of claim 1,
wherein the outer shell of the mounting lug (12) includes a top,
a bottom, and sides, and
wherein the mounting lug (12) further comprises:
a bore through the outer shell from the top to the bottom; a cavity enclosed by the outer shell and the bore; an interior lattice within the cavity and stiffening the mounting lug; and the damping media enclosed in the cavity and between solid portions of the interior lattice.

3. The method of claim 1, wherein the mounting lug is monolithic with the housing for the component, wherein the build powder from additive manufacturing is the damping media in the lug, and wherein the damping media has a particle size between 15 micrometers and 63 micrometers.

4. The method of claim 3, and further comprising:
heating the component to remove residual stress in the component at a temperature that maintains a granular structure of the encased build powder.

5. The method of claim 3, wherein heating the component to create a desired microstructure in solidified portions while maintaining the granular structure of the build powder encased in the mounting lug comprises:
heating the component at a minimum pressure sufficient to densify the housing of the component.

6. The method of claim 3, wherein heating the component to create a desired microstructure in solidified portions while maintaining the granular structure of the build powder encased in the mounting lug comprises:
heating the component at a minimum temperature sufficient to densify the housing of the component.

7. The method of claim 3, wherein heating the component to create a desired microstructure in solidified portions while maintaining the granular structure of the build powder encased in the mounting lug comprises:
heating the component while thermally shielding the mounting lug.

8. The method of claim 7, wherein additively manufacturing the component includes additively manufacturing the interior lattice with unit cells sized and positioned within the cavity to create surfaces for collisions with the damping media and stiffening the mounting lug.

9. The method of claim 1, wherein the additive manufacturing technique is chosen from the group consisting of electron beam melting, powder bed fusion, selective laser sintering, and combinations thereof.

* * * * *